United States Patent
Gundel et al.

(10) Patent No.: US 11,026,068 B2
(45) Date of Patent: Jun. 1, 2021

(54) WIRELESS SENSOR COMMUNICATION SYSTEM FOR ENCLOSURES

(71) Applicant: 3M INNOVATIVE PROPERTIES COMPANY, St. Paul, MN (US)

(72) Inventors: Douglas B. Gundel, Cedar Park, TX (US); Ernesto M. Rodriguez, Jr., Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/473,711

(22) PCT Filed: Jan. 4, 2018

(86) PCT No.: PCT/IB2018/050068
§ 371 (c)(1),
(2) Date: Jun. 26, 2019

(87) PCT Pub. No.: WO2018/127834
PCT Pub. Date: Jul. 12, 2018

(65) Prior Publication Data
US 2019/0349727 A1   Nov. 14, 2019

Related U.S. Application Data

(60) Provisional application No. 62/442,477, filed on Jan. 5, 2017.

(51) Int. Cl.
*H04W 4/38* (2018.01)
*H04W 84/18* (2009.01)
*H04W 88/16* (2009.01)

(52) U.S. Cl.
CPC ............. *H04W 4/38* (2018.02); *H04W 84/18* (2013.01); *H04W 88/16* (2013.01)

(58) Field of Classification Search
CPC ................................. H04W 4/38; H04W 84/18
See application file for complete search history.

(56) References Cited

U.S. PATENT DOCUMENTS

| 4,777,381 A | 10/1988 | Fernandes |
| 6,551,014 B2 | 4/2003 | Khieu et al. |

(Continued)

FOREIGN PATENT DOCUMENTS

| JP | 2007-251529 A | 9/2007 | |
| WO | WO-2007109555 A2 * | 9/2007 | ............. H02H 3/042 |

(Continued)

OTHER PUBLICATIONS

Confidence Del, Price Intelligence, MAP Monitoring, and Where to buy solution, Channel IQ, [Retrieved on Apr. 11, 2016], URL <http://www.channeliq.com/>, 4 pages.

(Continued)

*Primary Examiner* — Amine Benlagsir
(74) *Attorney, Agent, or Firm* — Gregg H. Rosenblatt

(57) ABSTRACT

A wireless sensor communication system for an enclosure includes a communication gateway and communication nodes within the enclosure. Each communication node includes a processor, a sensor, and a communication module. Each of the communication nodes is configured to wirelessly transmit information within the enclosure to another one of the communication nodes, and at least one of the communication nodes has an obstruction with the communication gateway impeding direct wireless communication with it. The communication nodes are configured to aggregate information received from obstructed communication nodes and wirelessly transmit the aggregated information. The aggregation of information for transmission provides for hopping communication to send sensor data or other information (Continued)

from the obstructed communication nodes to the communication gateway via other communication nodes.

15 Claims, 4 Drawing Sheets

(56) References Cited

U.S. PATENT DOCUMENTS

| | | | |
|---|---|---|---|
| 7,312,686 B2 | 12/2007 | Bruno | |
| 7,589,630 B2 | 9/2009 | Drake et al. | |
| 7,930,141 B2 | 4/2011 | Banting | |
| 7,943,868 B2 | 5/2011 | Anders et al. | |
| 8,135,352 B2 | 3/2012 | Langsweirdt et al. | |
| 8,258,977 B1 | 9/2012 | Montestruque | |
| 9,267,970 B2 | 2/2016 | Moreux et al. | |
| 2001/0024165 A1* | 9/2001 | Steen, III | H04M 3/00 340/870.01 |
| 2007/0229295 A1 | 10/2007 | Curt et al. | |
| 2008/0024318 A1* | 1/2008 | Hall | E21B 47/00 340/853.3 |
| 2008/0109889 A1 | 5/2008 | Bartels | |
| 2008/0174424 A1 | 7/2008 | Drake et al. | |
| 2008/0224542 A1 | 9/2008 | Freeman et al. | |
| 2008/0284585 A1 | 11/2008 | Schweitzer, III et al. | |
| 2009/0303039 A1 | 12/2009 | Drake et al. | |
| 2010/0046545 A1 | 2/2010 | Kagan et al. | |
| 2010/0271199 A1* | 10/2010 | Belov | G01M 5/00 340/539.3 |
| 2012/0038446 A1* | 2/2012 | McBee | G01R 19/00 336/176 |
| 2015/0142945 A1* | 5/2015 | Brandt | H04L 47/623 709/223 |
| 2015/0219691 A1 | 8/2015 | Cook et al. | |
| 2015/0245172 A1* | 8/2015 | Fernebok | H04W 4/029 455/456.3 |
| 2016/0208605 A1* | 7/2016 | Morrow | E21B 43/122 |
| 2016/0223592 A1 | 8/2016 | Vos | |
| 2016/0225248 A1 | 8/2016 | Rodriguez, Jr. et al. | |
| 2016/0276954 A1 | 9/2016 | Vos | |
| 2017/0363661 A1 | 12/2017 | Rodriguez, Jr. et al. | |
| 2018/0199172 A1* | 7/2018 | Boily | H04W 88/04 |

FOREIGN PATENT DOCUMENTS

| | | |
|---|---|---|
| WO | WO 2011-141911 | 11/2011 |
| WO | WO 2011-163279 | 12/2011 |
| WO | WO 2012-011094 | 1/2012 |
| WO | WO 2014-209739 | 12/2014 |
| WO | WO 2015-195861 | 12/2015 |

OTHER PUBLICATIONS

How to locate underground faults on cable, Electronic Engineering Portal (EEP), [Retrieved on Sep. 5, 2013], URL <http://electrical-engineering-portal.com/how-to-locate-underground-faults-on-cable>, 7 pages.

Open Channel Flow Measurement and Monitoring, Elan Technologies Inc., [Retrieved on Sep. 13, 2013], URL <http://elantechnologies.net/products-elan-manhole-antenna.html>, 2 pages.

Piezoelectric Products, Mide Technology, [Retrieved on Apr. 11, 2016], URL <http://www.mide.com/collections/piezoelectric-products>, 5 pages.

Manuale d'uso di Installazione Dispositivo RGDAT (RGDAT Device Use and Installation Manual, Technical Description SD 7865), ENEL, Published Feb. 2004, 32 pp.

Slootweg, "Incorporating Reliability Calculations in Routine Network Planning: Theory and Practice", 18th International Conference on Electricity Distribution, Turin, Jun. 6-9, 2005, 5 pages.

Zervos, "Thermoelectric Energy Harvesting 2014-2024: Devices, Applications, Opportunities", [Retrieved on Apr. 11, 2016], URL <http://www.idtechex.com/research/reports/thermoelectric-energy-harvesting-2014-2024>, 10 pages.

Zheng, Wireless Sensor Networks: A Networking Perspective, 184-229 (2008).

Zheng, Wireless Sensor Networks: A Networking Perspective, 287-343 (2008).

Zheng, Wireless Sensor Networks: A Networking Perspective, 83-136 (2008).

International Search Report for PCT International Application No. PCT/IB2018/050068, dated Mar. 13, 2018, 3 pages.

Supplemental EP Search Report for EP Appl. No. 18736479, dated May 8, 2020, 2 pp.

* cited by examiner

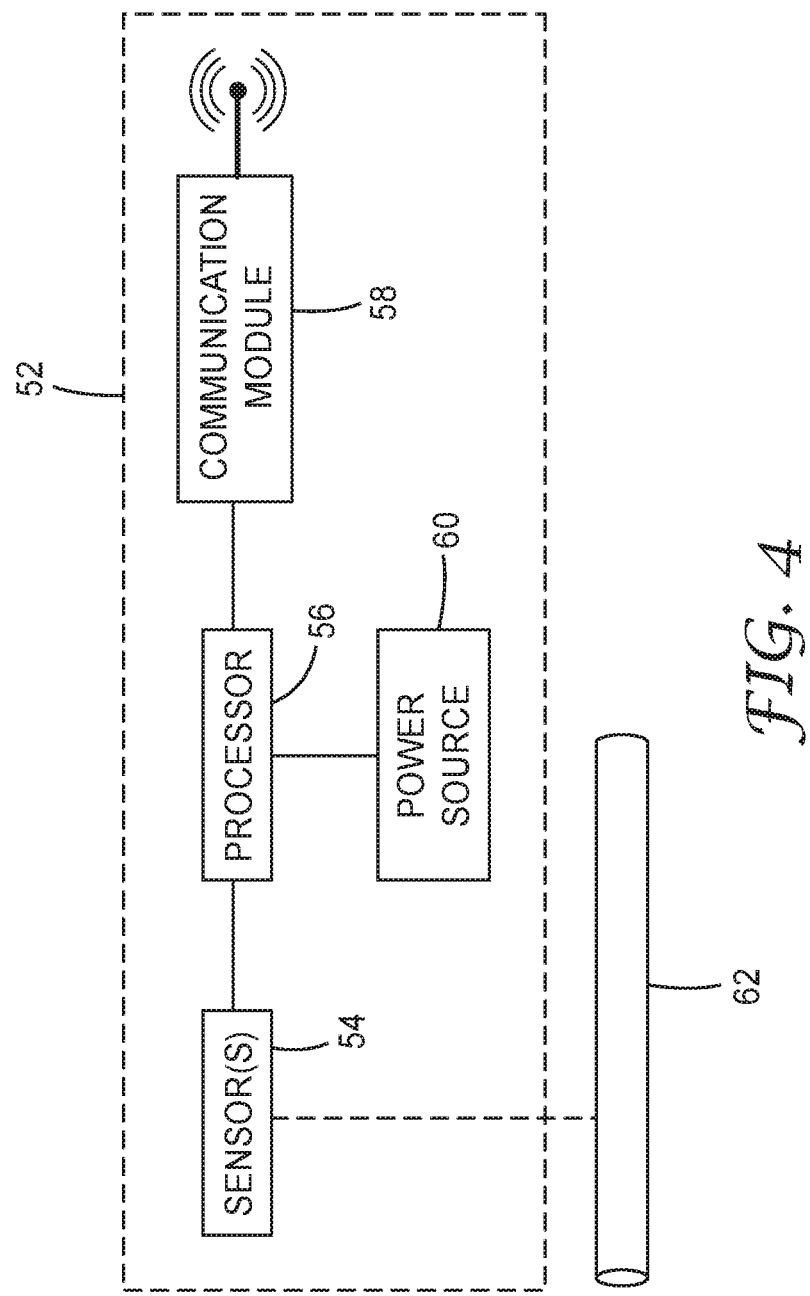

US 11,026,068 B2

WIRELESS SENSOR COMMUNICATION SYSTEM FOR ENCLOSURES

BACKGROUND

Underground monitoring systems have traditionally used wired sensors to communicate to a central location in an underground vault, manhole, or cabinet. The systems can analyze the sensor information and send the information to an external remote location such as a utility company. If there are many sensors, the wiring in the manhole can be problematic and can provide a challenge for workers who need to enter and work in the space. One solution involves the use of wireless communication, but radio frequency (RF) transmission can be challenging in these enclosures due to the presence of radio-opaque structures such as conduits, cables, or other internal metal structures. As a result, the sensor data is not effectively communicated. Accordingly, a need exists for a robust communication architecture for these obstructed enclosures so that the sensor data can be communicated to the central location within the enclosure despite obstructions.

SUMMARY

A wireless sensor communication system for an enclosure, consistent with the present invention, includes a communication gateway for wirelessly transmitting and receiving information within the enclosure and outside of the enclosure, and a plurality of communication nodes within the enclosure. Each of the communication nodes includes a processor, an optional sensor, and a communication module. The sensor is capable of sensing at least one of an environmental condition within the vicinity of the communication node, equipment emissions, such as electromagnetic, acoustic, or other, and electrical data such voltage or current of a line conductor. The communication module is also capable of wirelessly transmitting and receiving information within the enclosure.

Each of the communication nodes is configured to wirelessly transmit the information within the enclosure to another one of the communication nodes, and at least one of the communication nodes is configured to wirelessly transmit the information within the enclosure to the communication gateway. At least one of the communication nodes is configured to aggregate information received from one or more obstructed communication nodes with information from the communication node and wirelessly transmit the aggregated information within the enclosure. The aggregation of information for transmission provides for sending sensor data or other information from the obstructed communication nodes to the communication gateway via other communication nodes.

BRIEF DESCRIPTION OF THE DRAWINGS

The accompanying drawings are incorporated in and constitute a part of this specification and, together with the description, explain the advantages and principles of the invention. In the drawings.

FIG. 4 is a block diagram of an exemplary communication node.

DETAILED DESCRIPTION

Embodiments of this invention include a robust network for wireless sensor communication architecture in an enclosure where each sensor may not be able to communicate directly to a communication gateway. Instead, the communication can be directed ad-hoc to a visible (line of sight) node, which in turn can be connected to another node or the end node. In this way, obstructions such as walls, wires, and conduits will not prevent the sensor data transmission to the ultimate end destination such as the communication gateway. This modular and expandable communication architecture can be adapted to high voltage, medium voltage, and low voltage conduits without requiring significant modification to the infrastructure.

Figure 1:
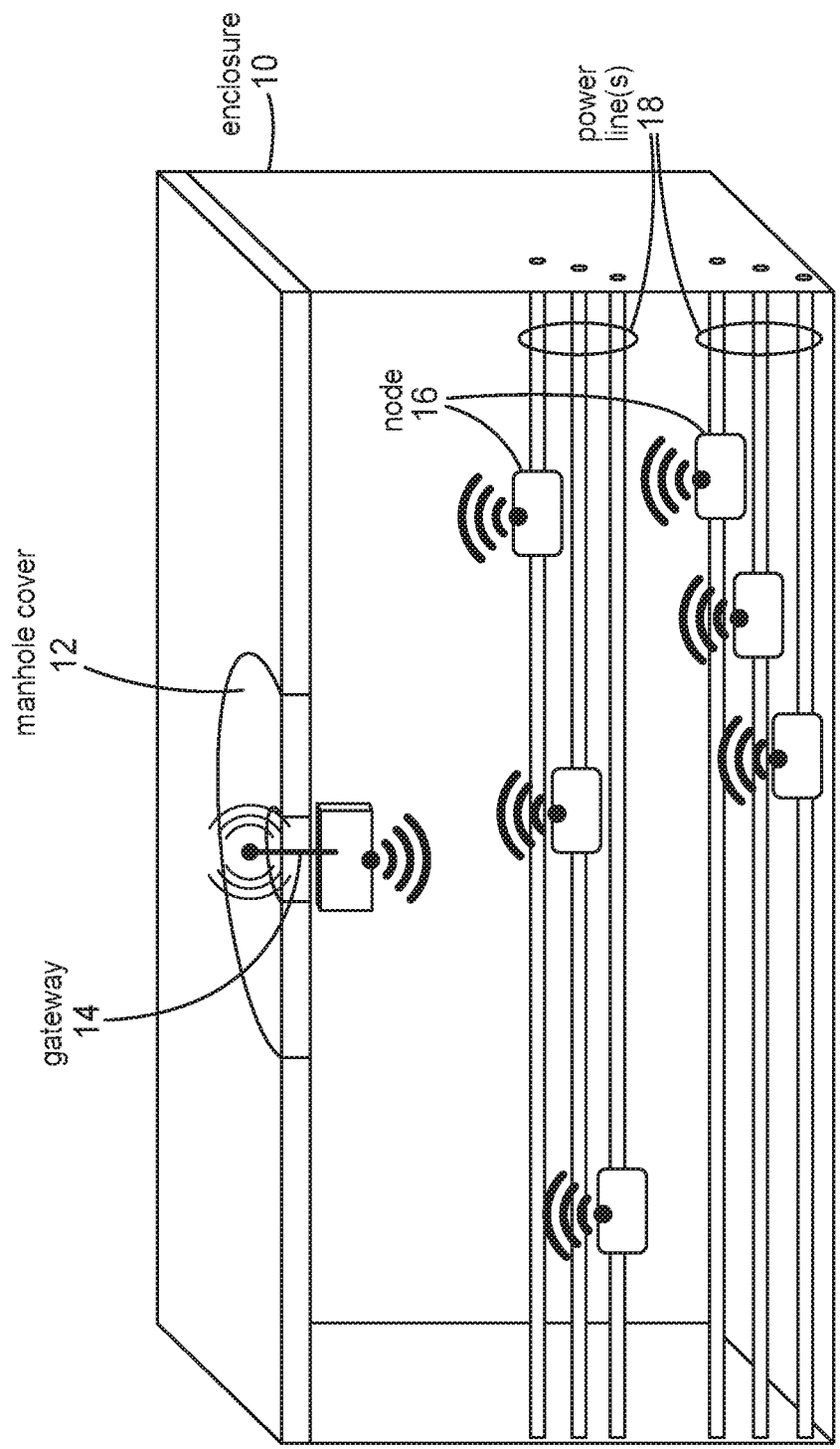
FIG. 1 is a perspective view block diagram of a wireless communication system for an enclosure.

FIG. 1 is a block diagram of the wireless communication system. The system is contained within an enclosure 10 having an access point such as a manhole cover 12. Examples of such enclosures include underground utility vaults and above ground (or grade level) utility cabinets. In some cases, the enclosure can include both an above ground utility cabinet over an underground utility vault. The system includes several communication nodes 16 associated with electrical power lines 18 and wirelessly communicating with a communication gateway 14 via wirelessly transmitting and receiving information. Communication gateway 14 can wirelessly transmit the received sensor data and other information to a remote location such as a utility company. An example of a communication gateway for an underground enclosure is disclosed in PCT Patent Application Publication No. WO 2015/195861, which is incorporated herein by reference as if fully set forth.

Figure 2:
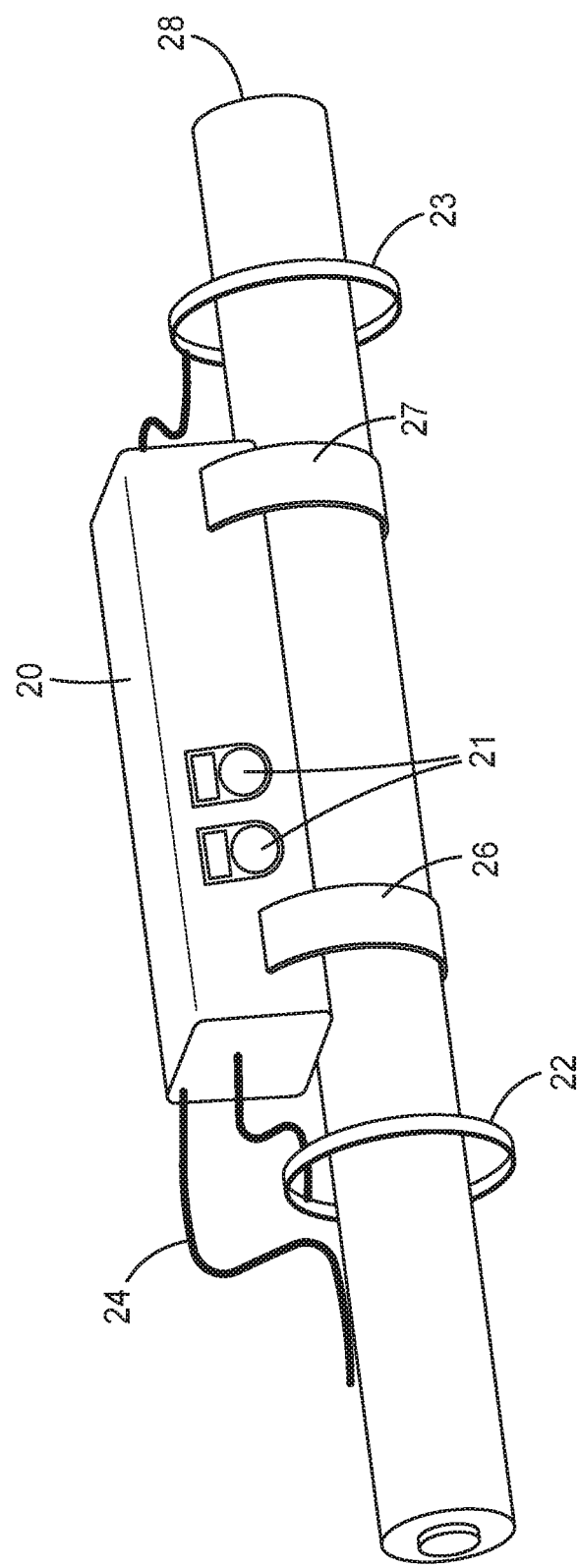
FIG. 2 is a diagram illustrating a communication node attached to a power line.

FIG. 2 is a diagram illustrating an exemplary communication node 20 for the system and attached to a power line 28. Communication node 20 may correspond with communication nodes 16. Communication node 20 is physically coupled to a power line 28 via straps 26 and 27, or other fasteners, and can include sensors for monitoring power line 28. For example, communication node 20 includes current measurement coils 22 and 23 for monitoring a current in power line 28 and a temperature measurement sensor 24 attached to power line 28. Communication node 20 also includes a communication module for wirelessly transmitting and receiving information. Communication node 20 can also include indicator lights 21 to indicate a status of the sensors or other components within communication node 20.

Figure 3:
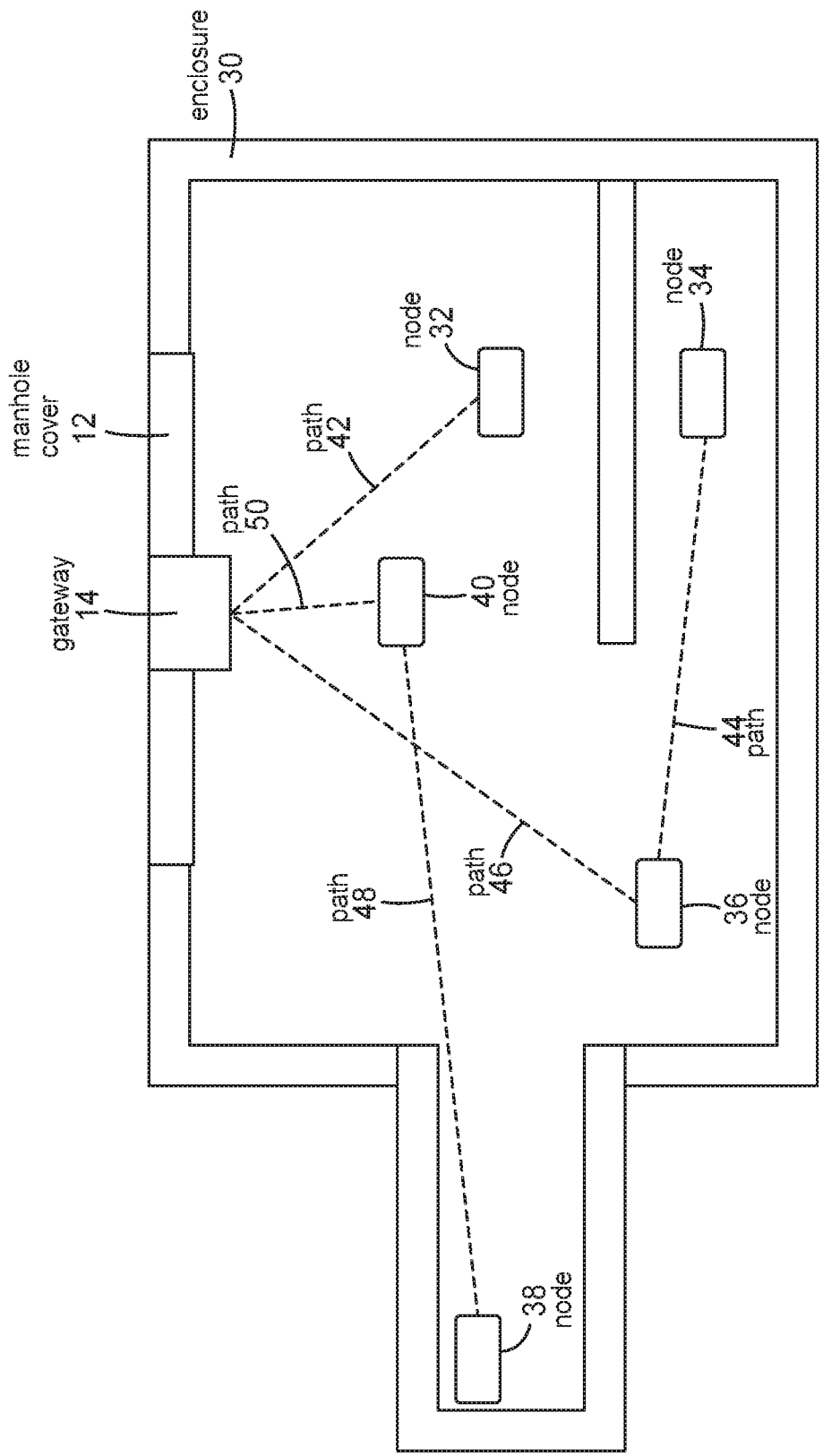
FIG. 3 is a block diagram illustrating communication paths among communication nodes in the system.

FIG. 3 is a block diagram illustrating communication paths among communication nodes in the system. In this example, various communication nodes are located within an enclosure 30 having manhole cover 12 and communication gateway 14. Communication nodes 32, 40, and 36 have communication paths 42, 50, and 46, respectively, to wirelessly transmit information directly to communication gateway 14, meaning within a line of sight from the communication nodes to the communication gateway. Other direct communication can include within a line of sight from one communication node to another communication node. The line of sight means the center of antenna to antenna from one device to another.

Communication nodes 34 and 38 have obstructions between them and communication gateway 14. The obstructions mean that the nodes are not within a line of sight of the gateway. Therefore, communication node 34 has a communication path 44 to communication node 36 which can wirelessly receive information from communication node 34 and transmit the information to communication gateway 14. Likewise, communication node 38 has a communication path 48 to communication node 40 which can wirelessly receive information from communication node 38 and transmit such information to communication gateway 14. This example thus illustrates "hopping" communication where certain communication nodes have obstructions between them and communication gateway 14, and information can be transmitted from node-to-node to reach the communication gateway or other ultimate destination.

FIG. 4 is a block diagram of an exemplary communication node, which may correspond with communication nodes 16. The communication node includes a processor electrically coupled with one or more sensors 54, a communication module 58, and a power source 60. The components 54, 56, 58, and 60, or some of them, can be contained within a housing 52 providing protection from the environment. Housing 52 can be implemented with a metal or plastic weather-proof box, for example. The one or more sensors 54 can be implemented with sensors for detecting electrical data such voltage or current within a power line 62, for measuring emissions (gas/particulate emissions, such as outgassing or smoke), and for measuring environmental conditions around power line 62, or within the vicinity of the communication node, such as temperature, humidity, and sound. In some cases, the sensors only monitor electrical data such voltage or current of a line conductor. In some cases, the sensors can also monitor emissions from the cable or equipment (e.g., electromagnetic, acoustic or other emissions), vibration sensing, or water and/or salinity levels. Furthermore, a communication node can optionally not include a sensor (or not use a sensor) and, instead, be used as a repeater to forward data between communication nodes or from another node to the gateway.

Power source 60 can be implemented with a portable power source such as a battery or with a circuit for harvesting power from power line 62. In addition, an energy storage device or device with similar capability can be integrated in the system. Communication module 58 can be implemented with a module or circuitry for wireless short range communication, and examples of such communication include the following: the WI-FI technology (Wi-Fi Alliance); the BLUETOOTH technology (Bluetooth SIG, Inc.); and the ZIGBEE wireless language (ZigBee Alliance).

Examples of a current sensor and a power harvesting circuit are disclosed in, respectively, US Patent Application Publication Nos. 2016/0223592 and 2016/0276954, both of which are incorporated herein by reference as if fully set forth. An example of a holder for a current sensor is disclosed in U.S. patent application Ser. No. 15/188,290, entitled "Holder with Self-Aligning Feature for Holding Current Sensor Around Line Conductor," and filed Jun. 21, 2016, which is incorporated herein by reference as if fully set forth.

As illustrated in FIGS. 3 and 4, the communication nodes wirelessly transmit and receive information to the communication gateway and to other communication nodes. When information is transmitted from one communication node to another, the information is aggregated for subsequent transmission. The information wirelessly transmitted among the communication nodes, and ultimately to the communication gateway, can include the following: an identification of the communication node from which the information originated; a date, time, and location stamp corresponding to when the information was collected or generated along with the geographic location of the same communication node; sensor data from the same communication node such as the environmental conditions identified above, electrical data, or both environmental conditions and electrical data; and thresholds for the same communication node. Table 1 is an exemplary data structure for such information transmitted among the communication nodes, including information aggregated from multiple communication nodes.

TABLE 1

| Node Information | |
|---|---|
| Current Communication Node | Data from the Communication Node |
| Node ID | Date, time, and location stamp |
| Node Sensors | Sensor data 1, 2, . . . n |
| Node Thresholds | Thresholds 1, 2, . . . n |
| Aggregated Communication Nodes | Data |
| Node 1 ID | Date, time, and location stamp for node 1 |
| Node 1 Sensors | Sensor data 1, 2, . . . n for node 1 |
| Node 1 Thresholds | Thresholds 1, 2, . . . n for node 1 |
| Node 2 ID | Date, time, and location stamp for node 2 |
| Node 2 Sensors | Sensor data 1, 2, . . . n for node 2 |
| Node 2 Thresholds | Thresholds 1, 2, . . . n for node 2 |
| . . . | |
| Node N ID | Date, time, and location stamp for node N |
| Node N Sensors | Sensor data 1, 2, . . . n for node N |
| Node N Thresholds | Thresholds 1, 2, . . . n for node N |

The thresholds can be used by the communication nodes to determine, for example, when to wirelessly transmit the information generated by the communication nodes, possibly including aggregated information from multiple communication nodes. Various conditions based upon the thresholds can be established such that the processors in the communication nodes are configured to transmit the information based upon such conditions.

These conditions can be established for thresholds of a particular communication node. For instance, a communication node 1 can have a condition 1 as follows: if any of the thresholds 1, 2, . . . n for Node 1 are satisfied, transmit sensor data to the next node. For example, if the temperature for the power line monitored by communication node 1 exceeds a particular threshold temperature, communication node 1 will then wirelessly transmit information including the temperature data from the corresponding sensor associated with communication node 1. As another example, communication node 1 can have another condition 2 as follows: if at least two of the thresholds 1, 2, . . . n for Node 1 are satisfied, transmit sensor data to the next node. For example, if the temperature and current for the power line monitored by communication node 1 exceeds both a particular threshold temperature and a particular current value, communication node 1 will then wirelessly transmit information including the temperature and current data from the corresponding sensor associated with communication node 1.

These conditions can also be established for thresholds of a particular communication node and aggregated sensor data transmitted by the particular communication node. The aggregated data includes the data from communication nodes having a communication path and transmitting information to the particular communication node. For instance, a communication node N can have a condition 1 as follows: if any of the thresholds 1, 2, . . . n for the aggregated nodes are satisfied, transmit aggregated sensor data to the next node. As another example, a communication node N can have a condition 2 as follows: if at least two of the thresholds 1, 2, . . . n for the aggregated nodes are satisfied, transmit aggregated sensor data to the next node.

The conditions provided above are exemplary, and other conditions based upon various thresholds or other information can also be established. Table 2 is an exemplary data structure for the conditions, which can be stored in the communication nodes, or otherwise accessed by the communication nodes, for determining when to wirelessly transmit information.

TABLE 2

| Communication Node Conditions | |
| --- | --- |
| Communication Node ID | Conditions for Transmission |
| Node 1 | Conditions 1, 2, . . . n for Node 1 |
| Node 2 | Conditions 1, 2, . . . n for Node 2 |
| . . . | |
| Node N | Conditions 1, 2, . . . n for Node N |

The invention claimed is:

1. A wireless sensor communication system for an enclosure, comprising:
a communication gateway for wirelessly transmitting and receiving information within the enclosure and outside of the enclosure, the information including sensor data related to electrical data measured within the enclosure and at least one of: an identification of a communication node from which the information originated; at least one of a date stamp, time stamp, and location stamp corresponding to when the information was collected or generated along with a geographic location of the communication node; sensor data related to environmental conditions measured within the enclosure; and thresholds for the communication node; and
a plurality of communication nodes, including a first communication node and a second communication node, the first and second communication nodes located within the enclosure, each of the first and second communication nodes comprising:
a processor;
a sensor electrically coupled with the processor, the sensor being capable of sensing at least one of an environmental condition, equipment emissions, and electrical data within a vicinity of the communication node; and
a communication module electrically coupled with the processor, the communication module wirelessly transmitting and receiving the information and comprising circuitry for wireless short range communication,
wherein each of the plurality of communication nodes is configured to wirelessly transmit the information to another one of the plurality of the communication nodes within the enclosure, and at least one of the plurality of the communication nodes is configured to wirelessly transmit at least one of the information and aggregated information to the communication gateway,
wherein the second communication node has an obstruction with the communication gateway impeding direct wireless communication with the communication gateway, and wherein the first communication node is configured to receive the information measured by the second communication node and aggregate the information received from the second communication node with the information measured by the first communication node to generate the aggregated information and wirelessly transmit the aggregated information within the enclosure, wherein a threshold value determines when the second communication node wirelessly transmits the information measured by the second communication node to the first communication node.

2. The system of claim 1, wherein said each of the plurality of the communication nodes is physically coupled with a power line within the enclosure.

3. The system of claim 2, wherein the sensor for said each of the plurality of the communication nodes senses a voltage or current from the coupled power line.

4. The system of claim 2, wherein said each of the plurality of the communication nodes has a power source electrically coupled with the processor, and the power source comprises a circuit for harvesting power from the coupled power line.

5. The system of claim 1, wherein the sensor for said each of the plurality of the communication nodes senses a temperature of a coupled power line.

6. The system of claim 1, wherein the sensor for said each of the plurality of the communication nodes senses a humidity within a vicinity of the communication node.

7. The system of claim 1, wherein said each of the plurality of the communication nodes has a power source electrically coupled with the processor.

8. The system of claim 1, wherein the processor is configured to transmit the information based upon conditions of the thresholds for the plurality of communication nodes transmitting the aggregated information.

9. The system of claim 1, wherein the information transmitted by the communication module includes the identification of the communication node from which the information originated.

10. The system of claim 1, wherein the information transmitted by the communication module includes the date stamp and the time stamp of when the information originated.

11. The system of claim 1, wherein the information transmitted by the communication module includes the geographic location of the communication node from which the information originated.

12. The system of claim 1, wherein each of the communication nodes is contained within a housing.

13. The system of any claim 1, wherein the plurality of communication nodes are contained within an underground utility vault.

14. The system of claim 1, wherein the enclosure comprises one of an underground utility vault, an above ground utility cabinet, and the above ground utility cabinet disposed over the underground utility vault.

15. The system of claim 1, wherein the communication gateway transmits the information to a remote utility company.

* * * * *